US012607204B2

(12) United States Patent
Wang et al.

(10) Patent No.: US 12,607,204 B2
(45) Date of Patent: Apr. 21, 2026

(54) NOISE ELIMINATION AND VIBRATION DAMPING DEVICE FOR AIR COMPRESSOR AND AIR COMPRESSOR

(71) Applicant: Jiangsu Easyland Automotive Corporation, Wuxi (CN)

(72) Inventors: Fangyong Wang, Wuxi (CN); Jianjun Huang, Wuxi (CN); Quan Liu, Wuxi (CN); Chengyu Wang, Wuxi (CN); Bifeng Yin, Wuxi (CN); Fei Dong, Wuxi (CN); Hekun Jia, Wuxi (CN)

(73) Assignee: Jiangsu Easyland Automotive Corporation, Wuxi (CN)

( * ) Notice: Subject to any disclaimer, the term of this patent is extended or adjusted under 35 U.S.C. 154(b) by 0 days.

(21) Appl. No.: 19/218,231

(22) Filed: May 24, 2025

(65) Prior Publication Data

US 2025/0283485 A1 Sep. 11, 2025

Related U.S. Application Data

(63) Continuation of application No. PCT/CN2024/086632, filed on Apr. 8, 2024.

(30) Foreign Application Priority Data

Oct. 30, 2023 (CN) .......................... 202311418530.3

(51) Int. Cl.
 *F04D 29/66* (2006.01)
 *F16F 13/22* (2006.01)
 *F16F 13/30* (2006.01)

(52) U.S. Cl.
 CPC ......... *F04D 29/668* (2013.01); *F04D 29/664* (2013.01); *F16F 13/22* (2013.01); *F16F 13/30* (2013.01)

(58) Field of Classification Search
 CPC .... F04D 29/663; F04D 29/665; F04D 29/668; F04D 29/664; F01D 25/04;
 (Continued)

(56) References Cited

FOREIGN PATENT DOCUMENTS

CN          117267182 A  * 12/2023
KR       20-0173238 Y1  * 12/1999
WO   WO-2018002833 A1  * 1/2018   ............ F16F 13/305

OTHER PUBLICATIONS

English machine translation of CN-117267182-A, Oct. 30, 2025.*
English machine translation of KR-20-0173238-Y1, Oct. 30, 2025.*

* cited by examiner

*Primary Examiner* — Christopher Verdier
(74) *Attorney, Agent, or Firm* — Hemisphere Law, PLLC

(57) ABSTRACT

A noise elimination and vibration damping device for an air compressor and an air compressor are provided. An air compressor vent is provided with an inner sleeve therein, a fixed end of the inner sleeve is connected to an inner wall surface of the air compressor vent, a suspended end of the inner sleeve is in a suspended state. A groove is defined on the air compressor vent. A space between the groove and the inner sleeve defines a noise elimination chamber, the noise elimination chamber is provided with multiple noise elimination regions arranged at intervals, and each of the multiple noise elimination regions is filled with magnetic fluid. A first-stage noise elimination structure is disposed on the inner sleeve. The suspended end can generate radial oscillation to drive the magnetic fluid to generate tangential oscillation, thereby attenuating an acoustic energy of a sound entering the noise elimination chamber.

7 Claims, 4 Drawing Sheets

(58) Field of Classification Search
CPC ..... F05D 2260/96; F16F 9/535; F16F 13/305;
F16F 2224/045; F16F 13/22; F16F 13/26;
F16F 13/30
USPC ........................................ 267/140.14, 140.15
See application file for complete search history.

A-A

B–B

NOISE ELIMINATION AND VIBRATION DAMPING DEVICE FOR AIR COMPRESSOR AND AIR COMPRESSOR

CROSS-REFERENCE TO RELATED APPLICATION

This application claims priority to Chinese Patent Application No. 202311418530.3, filed Oct. 30, 2023, which is herein incorporated by reference in its entirety.

TECHNICAL FIELD

The disclosure relates to the technical field of noise reduction or noise elimination for air compressors, and more particularly to a noise elimination and vibration damping device for an air compressor and an air compressor.

BACKGROUND

Advantages of turbocharging include increased power output, lower fuel consumption, and reduced pollutant emissions. Turbocharging of engines is no longer mainly considered from an aspect of high-power performance, but as a way to reduce fuel consumption and environmental pollution due to low carbon dioxide ($CO_2$) emissions.

Nowadays, a main reason for turbocharging is to use exhaust energy to reduce fuel consumption and emissions. In a turbocharged engine, combustion air is compressed before being supplied to the turbocharged engine. The turbocharged engine sucks out a same volume of air-fuel mixture as a naturally aspirated engine, but due to higher pressure, a higher density and more air and fuel mass are supplied to a combustion chamber in a controlled manner. Therefore, more fuel can be combusted, leading to an increase in engine's power output relative to speed and displacement.

In recent years, superchargers have been required to have high pressure ratios and high efficiency in order to improve a fuel efficiency of diesel engines and reduce nitrogen oxides (NOx). This requires the superchargers to be driven at high speed. However, driving the superchargers at high speed can achieve a high pressure ratio and high efficiency, but also leads to a baneful influence of increasing noise level.

An inlet and an outlet of a turbine are connected with pipelines for circulating exhaust gas, but a noise of the turbine penetrating through the pipeline can be suppressed by wrapping soundproofing materials on an outer surface of the pipelines. That is, a traditional soundproofing layer has a very insignificant soundproofing effect on an outlet of an air compressor.

SUMMARY

Regarding deficiencies in related art, the disclosure provides a noise elimination and vibration damping device for an air compressor and an air compressor. An inner wall surface of an air compressor vent is embedded in an end of an inner sleeve, and another end of the inner sleeve is in a suspended state. When a sound in the air compressor vent enters a tail part of a noise elimination chamber, a suspended end of the inner sleeve is configured to generate radial oscillation, thereby attenuating acoustic energy of the sound.

The disclosure achieves the aforementioned technical objectives through the following technical solutions.

Specifically, the noise elimination and vibration damping device for the air compressor is provided. The air compressor vent is provided with the inner sleeve therein, and a fixed end at an end of the inner sleeve is connected to the inner wall surface of the air compressor vent, the suspended end at another end of the inner sleeve is in the suspended state. A groove is arranged on the air compressor vent, and a space between the groove and the inner sleeve defines the noise elimination chamber. The noise elimination chamber is provided with multiple noise elimination regions arranged at intervals, and each of the multiple noise elimination regions is filled with magnetic fluid (i.e., a position of each of the multiple noise elimination regions coincides with that of magnetic fluid). A first-stage noise elimination structure is disposed on the inner sleeve. The suspended end is configured to, under the radial oscillation generated by the suspended end, drive the magnetic fluid in the multiple noise elimination regions to generate tangential oscillation, thereby attenuating the acoustic energy of a sound entering the noise elimination chamber. The suspended end is configured to, under the radial oscillation generated by the suspended end, drive a space at the tail part of the noise elimination chamber to generate fluctuations, to thereby drive the magnetic fluid in the noise elimination chamber to generate fluctuations in a thickness of the magnetic fluid. Since the magnetic fluid is incompressible, the fluctuations in the thickness of the magnetic fluid are converted into tangential oscillation. The tangential oscillation of adjacent magnetic fluid can attenuate the acoustic energy of the sound entering the noise elimination chamber. That is, in the disclosure, an attenuation of the acoustic energy of the sound entering the noise elimination chamber is accelerated through the tangential oscillation and the radial oscillation, so that an ability to attenuate the acoustic energy exceeds that of using the tangential oscillation or the radial oscillation alone.

In an embodiment, an outer wall surface of the air compressor vent corresponding to each of the multiple noise elimination regions is provided with a magnetic device, and the magnetic device is configured to, under a magnetic field generated by the magnetic device, limit a flow of the magnetic fluid.

In an embodiment, each magnetic device is connected to a linear moving mechanism. The liner moving mechanism is configured to drive the magnetic device to move along an axial direction of an outlet of an air compressor, thereby changing a distance between the magnetic fluid in the multiple noise elimination regions and the suspended end so as to change a frequency of the radial oscillation generated by the suspended end.

In an embodiment, at least one magnetic device is connected to a rotating mechanism, and the rotating mechanism is configured to drive the magnetic device to swing periodically around the outer wall surface of the air compressor vent. The magnetic fluid is configured to, under circumferential swinging of the magnetic fluid, alternately compress chambers on two sides of the magnetic fluid, thereby intensifying the tangential oscillation of the chambers.

In an embodiment, at least two magnetic devices spaced-apart are connected to the rotating mechanism.

In an embodiment, a second-stage noise elimination structure is disposed inside the noise elimination chamber, and the second-stage noise elimination structure is located in the noise elimination chamber between the first-stage noise elimination structure and the multiple noise elimination regions.

In an embodiment, the second-stage noise elimination structure is a perforated plate. An upper surface of the perforated plate is connected to an inner wall surface of the noise elimination chamber. A gap X is defined between a lower surface of the perforated plate and an outer ring of the inner sleeve. The gap X is larger than an amplitude of the inner sleeve at an installation position of the perforated plate. The gap X is configured to avoid an elimination of the radial oscillation at the suspended end. The gap X between the lower surface of the perforated plate and the outer ring of the inner sleeve is an annular slit, and the annular slit is configured to cooperate with holes in the perforated plate to realize the noise elimination.

In an embodiment, an installation groove is defined on the inner wall surface of the air compressor vent at a position of the suspended end. An elastic hollow tube is disposed inside the installation groove, an outer wall surface of the elastic hollow tube is in contact with the suspended end, and the elastic hollow tube is provided with a through hole. The suspended end is configured to drive the elastic hollow tube to produce resonance. During an oscillation process, the elastic hollow tube is configured to compress a sound inside the hollow tube. When the sound flows through the through hole of the elastic hollow tube, the elastic hollow tube is configured to generate damping and dissipate vibration energy, thereby improving sound absorption performance.

In an embodiment, an outer wall surface of the suspended end is a conical surface, the elastic hollow tube is tangent to the conical surface, and a center line of the through hole is parallel to the tangent line.

The disclosure further provides the air compressor, and at least one of an air inlet and an air outlet of the air compressor is provided with the noise elimination and vibration damping device for the air compressor.

The disclosure possesses the following six beneficial effects.

1. In the noise elimination and vibration damping device for the air compressor, the inner wall surface of the air compressor vent is embedded in the end of the inner sleeve, and another end of the inner sleeve is in the suspended state. When the sound in the air compressor vent enters the tail part of the noise elimination chamber, the suspended end of the inner sleeve can generate the radial oscillation, thereby attenuating the acoustic energy.

2. In the noise elimination and vibration damping device for the air compressor, the noise elimination chamber is provided with the multiple noise elimination regions arranged at intervals, and each of the multiple noise elimination regions is filled with the magnetic fluid. The suspended end can drive, under the radial oscillation generated by the suspended end, the space at the tail part of the noise elimination chamber to generate the fluctuations, to thereby drive the magnetic fluid in the noise elimination chamber to generate the fluctuations in the thickness of the magnetic fluid. Since the magnetic fluid is incompressible, the fluctuations in the thickness of the magnetic fluid are converted into the tangential oscillation; and the tangential oscillation of adjacent magnetic fluid can attenuate the acoustic energy of the sound entering the noise elimination chamber. That is, in the disclosure, the attenuation of the acoustic energy of the sound entering the noise elimination chamber is accelerated through the tangential oscillation and the radial oscillation, so that the ability to attenuate the acoustic energy exceeds that of using the tangential oscillation or the radial oscillation alone.

3. In the noise elimination and vibration damping device for the air compressor, the outer wall surface of the air compressor vent corresponding to each of the multiple noise elimination regions is provided with the magnetic device, and the magnetic device can limit, under the magnetic field generated by the magnetic device, the flow of the magnetic fluid. Each magnetic device is connected to the linear moving mechanism, and the linear moving mechanism can drive the magnetic device to move along the axial direction of the outlet of the air compressor, to thereby drive the magnetic fluid corresponding to the magnetic device to move along the axial direction of the outlet of the air compressor, thereby changing the distance between the multiple noise elimination regions and the suspended end so as to change the frequency of the radial oscillation generated by the suspended end.

4. In the noise elimination and vibration damping device for the air compressor, at least one magnetic device is connected to the rotating mechanism. The rotating mechanism can drive the magnetic device to swing periodically around the outer wall surface of the air compressor vent, to thereby drive the magnetic fluid in the multiple noise elimination regions to swing circumferentially. The magnetic fluid can, under the circumferential swinging of the magnetic fluid, alternately compress the chambers on two sides of the magnetic fluid, thereby intensifying the tangential oscillation of the chambers.

5. In the noise elimination and vibration damping device for the air compressor, the installation groove is defined on the inner wall surface of the air compressor vent at the position of the suspended end. The elastic hollow tube is disposed inside the installation groove, and the outer wall surface of the elastic hollow tube is in contact with the suspended end. The elastic hollow tube is defined with the through hole thereon. The suspended end can drive, under the radial oscillation generated by the suspended end, the elastic hollow tube to produce resonance During the oscillation process, the elastic hollow tube can compress the sound therein. When the sound flows through the through hole of the elastic hollow tube, the elastic hollow tube can generate the damping and dissipate the vibration energy, thereby improving the sound absorption performance.

6. In the noise elimination and vibration damping device for the air compressor, the first-stage noise elimination structure is disposed on the wall surface of the inner sleeve, and the first-stage noise elimination structure can attenuate the acoustic energy. The second-stage noise elimination structure is disposed on the noise elimination chamber between the first-stage noise elimination structure and the multiple noise elimination regions, and the second-stage noise elimination structure can further attenuate the acoustic energy.

BRIEF DESCRIPTION OF DRAWINGS

To more clearly describe technical solutions in embodiments of the disclosure or in related art, attached drawings to be used in the description of the embodiments or related art will be briefly described below. The attached drawings in the following description illustrate some embodiments of the disclosure, and it is apparent to those skilled in the art that other attached drawings can be obtained based on these drawings without creative labor.

Figure 1:
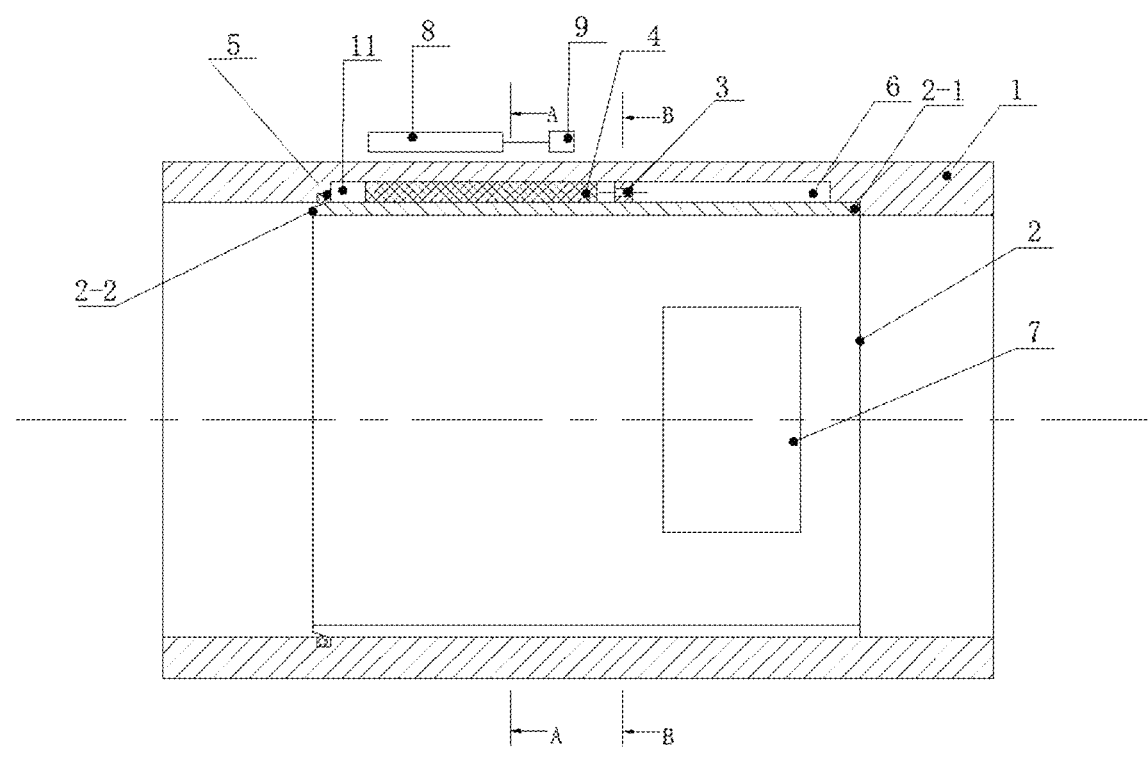
FIG. 1 illustrates an assembly diagram of a noise elimination and vibration damping device for an air compressor according to an embodiment of the disclosure.

Description of reference numerals: 1: air compressor vent; 1-1: protrusion; 1-2: installation groove; 2: inner sleeve; 2-1: fixed end; 2-2: suspended end; 2-3: notch; 2-4: conical surface; 2-5: tangent line; 2-6: center line; 3: perforated plate; 4: magnetic fluid; 5: elastic hollow tube; 5-1: through hole; 6: noise elimination chamber; 7: first-stage noise elimination structure; 8: magnetic device; 9: linear moving mechanism; 10: rotating mechanism; 11: groove.

DETAILED DESCRIPTION OF EMBODIMENTS

Embodiments of the disclosure will be described in detail as follows, and examples of the embodiments are illustrated in attached drawings, wherein same or similar reference numerals throughout indicate same or similar elements or elements having same or similar functions. The embodiments described below by referring to the attached drawings are exemplary and are intended to explain the disclosure, but not to be construed as limiting the disclosure.

In descriptions of the disclosure, it should be noted that orientation or positional relationships indicated by terms "center", "longitudinal", "lateral", "length", "width", "thickness", "upper", "lower", "axial", "radial", "vertical", "horizontal", "inner", "outer", etc., are based on the orientation or positional relationships illustrated in the attached drawings. These terms are intended only to facilitate a description of the disclosure and to simplify the description, and are not intended to indicate or imply that device or components referred to must have a specific orientation, or be constructed and operated in a specific orientation. Therefore, these terms should not be construed as limitations to the disclosure. In addition, terms "first" and "second" are only used for descriptive purposes and cannot be understood as indicating or implying relative importance or implicitly indicating a number of indicated technical features. Therefore, a feature defined with "first" or "second" may explicitly or implicitly include one or more such features. In the description of the disclosure, "multiple" means two or more, unless otherwise specifically defined.

In the disclosure, unless otherwise clearly specified and limited, terms "dispose", "link", "connect", and "fix" should be understood in a broad sense. For example, it can be a fixed connection, a detachable connection, an integral connection, a mechanical connection, an electrical connection, a direct connection, an indirect connection through an intermediate medium, or an internal connection between two components. For those skilled in the art, the specific meanings of the above terms in the disclosure can be understood according to specific situations.

Figure 2:
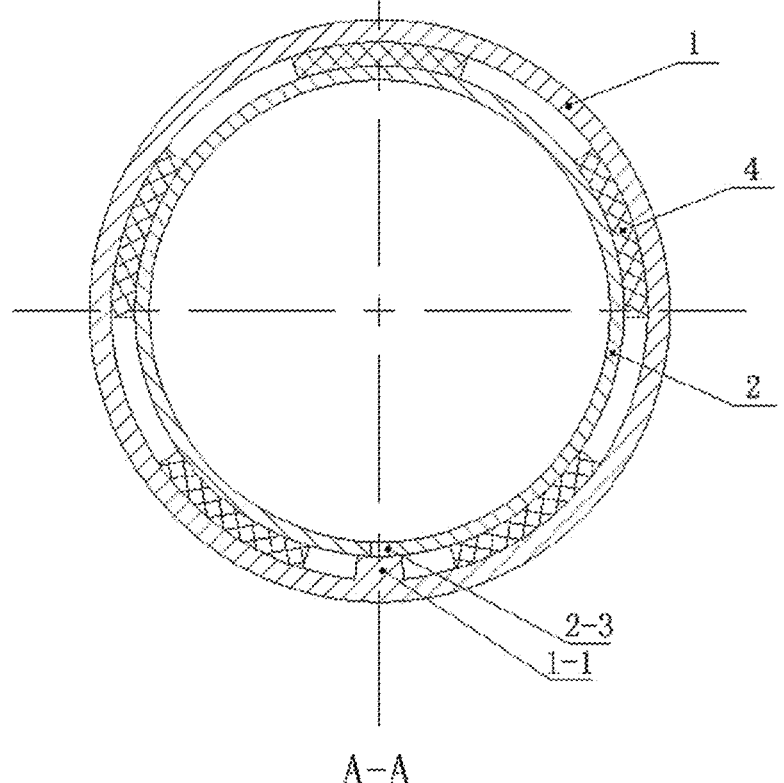
FIG. 2 illustrates a sectional view of the noise elimination and vibration damping device for the air compressor along a line A-A in FIG. 1.
Figure 3:
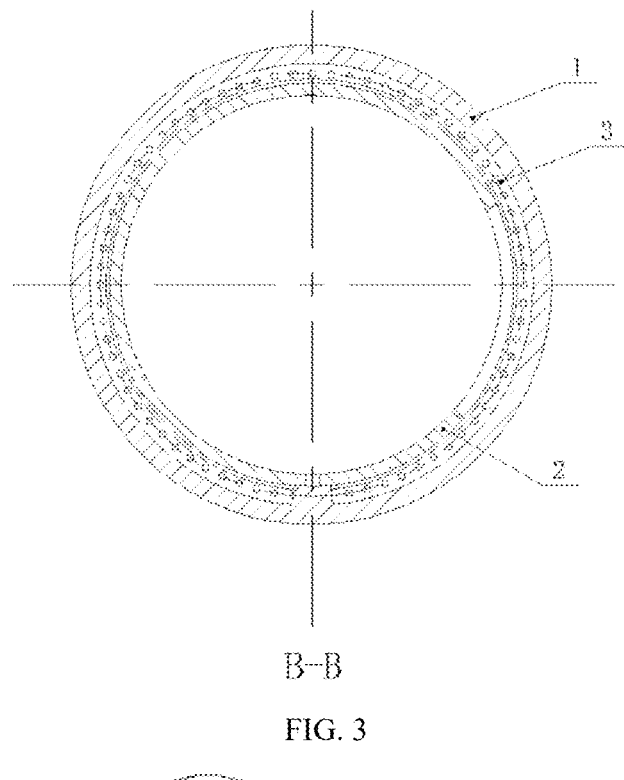
FIG. 3 illustrates a sectional view of the noise elimination and vibration damping device for the air compressor along a line B-B in FIG. 1.

As illustrated in FIG. 1 and FIG. 2, the disclosure provides a noise elimination and vibration damping device for an air compressor. An inner wall surface of an air compressor vent 1 is connected to an end of an inner sleeve 2, that is, the end of the inner sleeve 2 is a fixed end 2-1, and the other end of the inner sleeve 2 is in a suspended state. A gap is defined between the other end of the inner sleeve 2 and an inner wall surface of the air compressor vent 1, and the other end of the inner sleeve 2 is a suspended end 2-2. The inner sleeve 2 is a thin-walled tube. A notch 2-3 is defined on the inner sleeve 2 along an axial direction of the inner sleeve 2, and the notch 2-3 is configured to facilitate the inner sleeve 2 to be installed in the air compressor vent 1, and additionally to facilitate the inner sleeve 2 to generate deformation. An annular groove with a notch is defined on the air compressor vent 1. A noise elimination chamber 6 is defined between the annular groove and an outer wall surface of the inner sleeve 2, and an axial length of the noise elimination chamber 6 is less than an axial length of the inner sleeve 2. The annular groove with the notch forms a protrusion 1-1 on the air compressor vent 1. The notch 2-3 in the inner sleeve 2 is located at a position of the protrusion 1-1, and a width of the protrusion 1-1 is greater than a spacing of the notch 2-3, so that a bottom of the inner sleeve 2 can be supported at the protrusion 1-1. The air compressor vent 1 can be an air inlet or outlet of the air compressor or other exhaust bypass of the air compressor.

The noise elimination chamber 6 is provided with multiple noise elimination regions arranged at intervals, and each of the multiple noise elimination regions is filled with magnetic fluid 4. An outer wall surface of the air compressor vent 1 corresponding to each of the multiple noise elimination regions is provided with a magnetic device 8, and the magnetic device 8 is configured to, under a magnetic field generated by the magnetic device 8, limit a flow of the magnetic fluid 4. In addition, a position of the magnetic field can be changed, thereby changing positions of the multiple noise elimination regions. Chambers are defined between adjacent noise elimination regions of the multiple noise elimination regions. The multiple noise elimination regions arranged at intervals are configured to be close to the suspended end 2-2 of the inner sleeve 2, but to be separated from the suspended end 2-2 by a certain distance.

Figure 4:
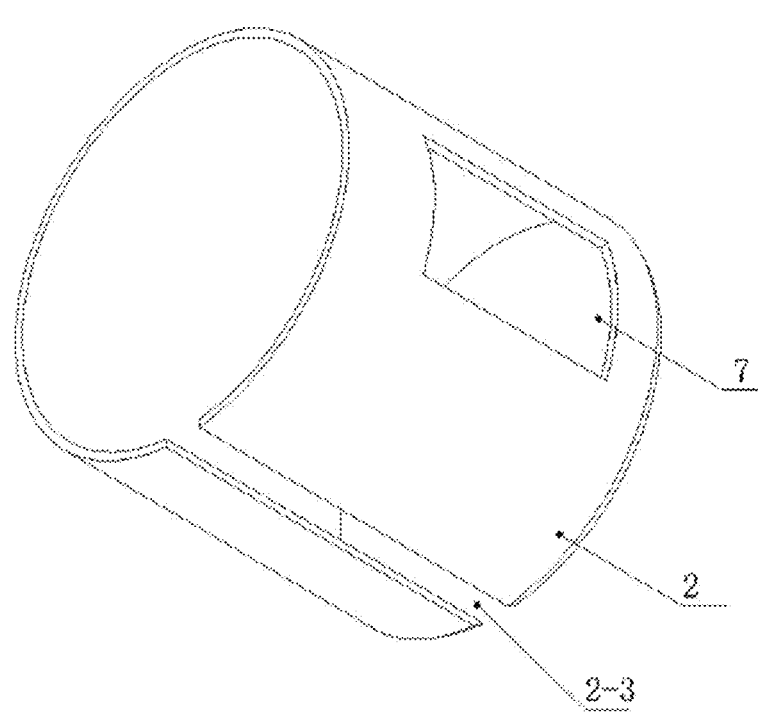
FIG. 4 illustrates a three-dimensional view of an inner sleeve according to the disclosure.

As illustrated in FIG. 4, a first-stage noise elimination structure 7 is disposed on a wall surface of the inner sleeve 2, and the first-stage noise elimination structure 7 is further configured to be a rectangular groove. At least one rectangular groove is defined on an arc-shaped wall surface of the inner sleeve 2. The rectangular groove is configured to connect the air compressor vent 1 with the noise elimination chamber 6, thereby attenuating acoustic energy.

Figure 7:
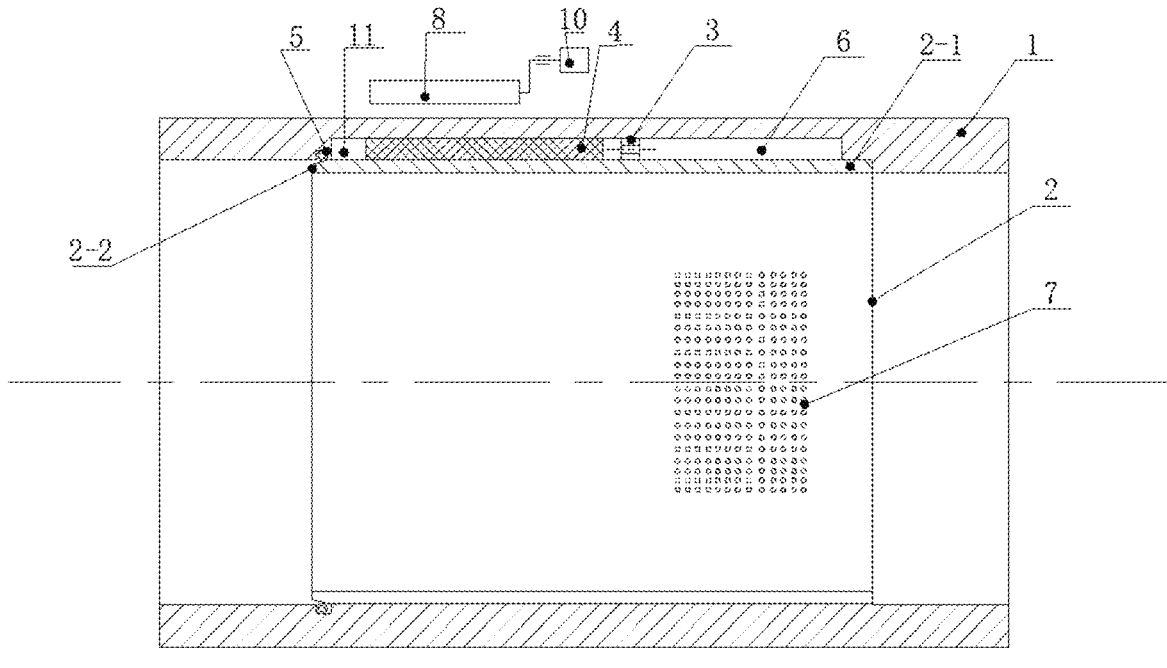
FIG. 7 illustrates an assembly diagram of a noise elimination and vibration damping device for an air compressor according to another embodiment of the disclosure.

In an illustrated embodiment, as illustrated in FIG. 7, a structure of the first-stage noise elimination structure 7 is configured to be multiple perforated plates. Multiple through holes are provided on the arc-shaped wall surface of the inner sleeve 2, and the multiple through holes are configured to connect the air compressor vent 1 with the noise elimination chamber 6, thereby attenuating the acoustic energy.

Since the other end of the inner sleeve 2 is in the suspended state, when the sound in the air compressor vent 1 enters a tail part of the noise elimination chamber 6, the suspended end 2-2 of the inner sleeve 2 can generate radial oscillation, thereby further attenuating the acoustic energy. A frequency of the radial oscillation depends on a distance between the multiple noise elimination regions and the suspended end 2-2. Although the bottom of the inner sleeve 2 can be supported at the protrusion 1-1, since the protrusion 1-1 is much smaller than a circumference of the inner sleeve 2, this support can be regarded as a point-support on the circumference. Strictly speaking, although it cannot be thought that there is no possibility of slightly suppressing the radial oscillation of the suspended end 2-2, an area affected by an elimination amount caused by the point-support on the circumference is also very limited, so it can be ignored. The magnetic fluid 4 in the noise elimination chamber 6 can be regarded as a kind of elastic damping fluid. Although the flow of the magnetic fluid 4 can be limited by the magnetic field generated by the magnetic device 8, when the sound enters the chamber between adjacent magnetic fluids 4, the sound can cause the compressed magnetic fluid 4 to generate tangential oscillation, and the radial oscillation of the suspended end 2-2 intensifies the tangential oscillation of the magnetic fluid 4. The suspended end 2-2 can drive, under the radial oscillation generated by the suspended end 2-2, the space at the tail part of the noise elimination chamber 6 to generate fluctuations, to thereby drive the magnetic fluid 4 in the noise elimination chamber 6 to generate fluctuations in thickness of the magnetic fluid 4. Since the magnetic fluid 4 is incompressible, the fluctuations in the thickness of the magnetic fluid 4 are converted into the tangential oscillation. The tangential oscillation of the magnetic fluid 4 in adjacence can attenuate the acoustic energy of the sound entering the noise elimination chamber 6. That is, in the disclosure, the attenuation of the acoustic energy of the sound entering the noise elimination chamber 6 is accelerated through the tangential oscillation and the radial oscillation, so that the ability to attenuate the acoustic energy exceeds that of using the tangential oscillation or the radial oscillation alone.

In an embodiment, the noise elimination chamber 6 is provided with the multiple noise elimination regions arranged at intervals, and the multiple noise elimination regions are 3-6 in number. Each of the multiple noise elimination regions is filled with the magnetic fluid 4. The outer wall surface of the air compressor vent 1 corresponding to each of the multiple noise elimination regions is provided with the magnetic device 8. Each magnetic device 8 is connected to a linear moving mechanism 9, and the linear moving mechanism 9 can drive the magnetic device 8 to move along an axial direction of the air compressor vent 1, to thereby drive the magnetic fluid 4 corresponding to the magnetic device 8 to move along the axial direction, thereby changing the distance between the multiple noise elimination regions and the suspended end 2-2, so as to change the frequency of the radial oscillation generated by the suspended end 2-2. The linear moving mechanism 9 is generally an air cylinder, a hydraulic cylinder, or a linear screw.

In an embodiment, the noise elimination chamber 6 is provided with the multiple noise elimination regions arranged at intervals, and the multiple noise elimination regions are 3-6 in number. Each of the multiple noise elimination regions is filled with the magnetic fluid 4. The outer wall surface of the air compressor vent 1 corresponding to each of the multiple noise elimination regions is provided with the magnetic device 8. One magnetic device 8 is connected to a rotating mechanism 10. The rotating mechanism 10 can drive the magnetic device 8 to swing periodically around the outer wall surface of the air compressor vent 1, to thereby drive the magnetic fluid 4 in the multiple noise elimination regions to swing circumferentially. The magnetic fluid 4 can, under circumferential swinging of the magnetic fluid 4, alternately compress the chambers on two sides of the magnetic fluid 4, thereby intensifying the tangential oscillation of the chambers.

In an embodiment, multiple magnetic devices 8 are connected to multiple rotating mechanisms 10, and the multiple magnetic devices 8 are respectively connected to a corresponding one of the multiple rotating mechanisms 10, and each of the multiple magnetic devices 8 can respectively be rotated at different angles. Alternatively, the multiple magnetic devices 8 are connected to one rotating mechanism 10 to achieve synchronized rotations of the multiple magnetic devices 8. When the multiple magnetic devices 8 are connected to one rotating mechanism 10, generally the multiple spaced-apart magnetic devices 8 are connected to one rotating mechanism 10. When the noise elimination chamber 6 is provided with five noise elimination regions arranged at intervals therein, each of the five noise elimination regions corresponds to one magnetic device 8; and different magnetic devices 8 are distinguished by serial numbers, namely, magnetic device No. 1, magnetic device No. 2, magnetic device No. 3, magnetic device No. 4, and magnetic device No. 5. The magnetic device No. 1, the magnetic device No. 3, and the magnetic device No. 5 are connected to one rotating mechanism 10; or the magnetic device No. 2 and the magnetic device No. 4 are connected to one rotating mechanism 10. The rotating mechanism 10 is a slewing mechanism in related art, composed of a gear train.

Figure 5:
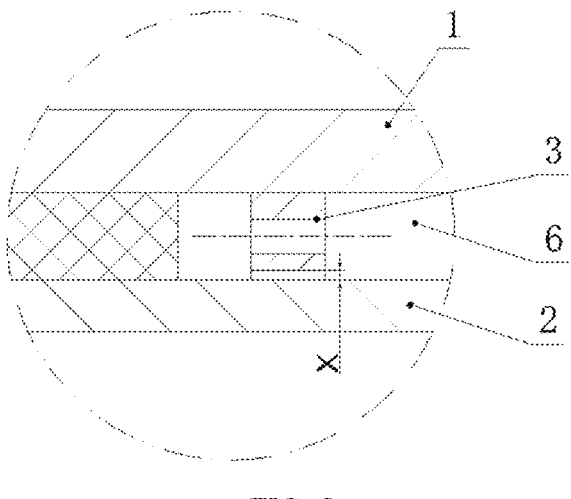
FIG. 5 illustrates a schematic partial installation diagram of a perforated plate according to the disclosure.

As illustrated in FIG. 1 and FIG. 5, in another embodiment, a perforated plate 3 is disposed in the noise elimination chamber 6, the perforated plate 3 is located in the noise elimination chamber 6 between the first-stage noise elimination structure 7 and the multiple noise elimination regions, and the perforated plate 3 can be regarded as a second-stage noise elimination structure. An upper surface of the perforated plate 3 is connected to an inner wall surface of the noise elimination chamber 6, and a gap X is defined between a lower surface of the perforated plate 3 and an outer ring of the inner sleeve 2. The gap X is larger than an amplitude of the inner sleeve 2 at an installation position of the perforated plate 3. The gap X is configured to avoid the elimination of the radial oscillation at the suspended end 2-2. The gap X between the lower surface of the perforated plate 3 and the outer ring of the inner sleeve 2 is an annular slit, and the annular slit is configured to cooperate with holes in the perforated plate 3 to realize the noise elimination.

Figure 6:
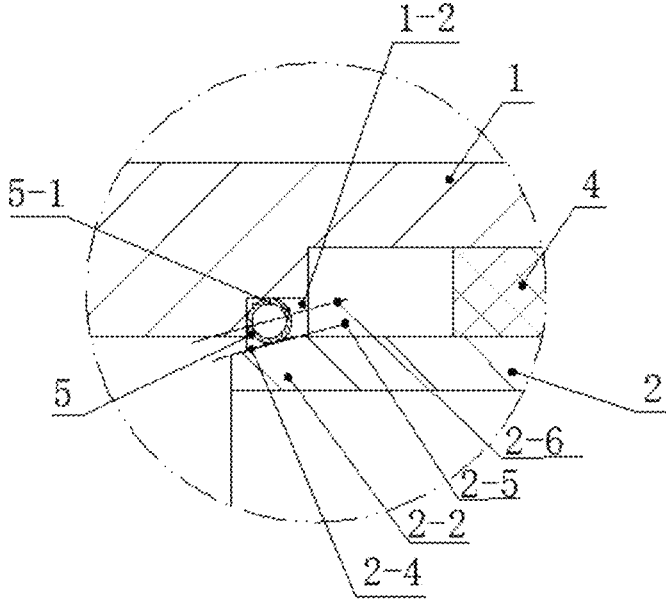
FIG. 6 illustrates a schematic partial installation diagram of an elastic hollow tube according to the disclosure.

Since a gap is defined between the suspended end 2-2 of the inner sleeve 2 and the inner wall surface of the air compressor vent 1, experiments have proven that when a pressure at the air compressor vent 1 is relatively high, a certain amount of noise will be generated by the gap. Therefore, the disclosure provides an installation groove 1-2 on the inner wall surface of the air compressor vent 1 at a position of the suspended end 2-2. An elastic hollow tube 5 is disposed inside the installation groove 1-2, and an outer wall surface of the elastic hollow tube 5 is in contact with the suspended end 2-2. The elastic hollow tube 5 is defined with a through hole 5-1, as illustrated in FIG. 1 and FIG. 6. The suspended end 2-2 is configured to, under the radial oscillation generated by the suspended end 2-2, drive the elastic hollow tube 5 to oscillate together. During an oscillation process, the elastic hollow tube 5 is configured to compress the sound therein. When the sound flows through the through hole 5-1 of the elastic hollow tube 5, the elastic hollow tube 5 is configured to generate damping and dissipate vibration energy, thereby improving sound absorption performance.

To realize a better noise elimination performance, the through hole 5-1 on the elastic hollow tube 5 is merely configured to connect an inner side of the elastic hollow tube 5 with the noise elimination chamber 6; or the through hole 5-1 on the elastic hollow tube 5 is merely configured to connect an inner side of the elastic hollow tube 5 with the air compressor vent 1.

As illustrated in FIG. 6, an outer wall surface of the suspended end 2-2 is a tapered conical surface 2-4. A bottom part of the elastic hollow tube 5 is tangent to the conical surface 2-4, the elastic hollow tube 5 is in contact with at least one surface of the installation groove 1-2, and a center line 2-6 of the through hole 5-1 is parallel to the tangent line 2-5. In this way, when the suspended end 2-2 generates the radial oscillation, the elastic hollow tube 5 compresses the sound therein during the oscillation process. When the sound flows through the through-hole 5-1 of the elastic hollow tube 5, the elastic hollow tube 5 will generate an optimal damping.

In the air compressor, the noise elimination and vibration damping device for the air compressor can be installed on at least one of an air inlet and an air outlet of the air compressor or other exhaust bypass of the air compressor.

It should be noted that, although the specification is described according to various embodiments, it doesn't mean that each embodiment only contains an independent technical solution. This way of description in the specification is just for a sake of clarity. Those skilled in the art should regard the specification as a whole, and the technical solutions in each embodiment can also be appropriately combined to form other implementation modes that can be understood by those skilled in the art.

The aforementioned series of detailed descriptions merely specific illustrations of the feasible embodiments of the disclosure, and are not intended to limit the scope of protection of the disclosure. All equivalent embodiments or modifications made without departing from the technical spirit of the disclosure shall fall within the scope of protection of the disclosure.

What is claimed is:

1. A noise elimination and vibration damping device for an air compressor, wherein an air compressor vent (1) is provided with an inner sleeve (2) therein, a fixed end (2-1) at an end of the inner sleeve (2) is connected to an inner wall surface of the air compressor vent (1), a suspended end (2-2) at another end of the inner sleeve (2) is in a suspended state; a groove (11) is arranged on the air compressor vent (1), and a space between the groove (11) and the inner sleeve (2) defines a noise elimination chamber (6); the noise elimination chamber (6) is provided with a plurality of noise elimination regions arranged at intervals, and each of the plurality of noise elimination regions is filled with magnetic fluid (4); a first-stage noise elimination structure (7) is disposed on the inner sleeve (2); and the suspended end (2-2) is configured to, under radial oscillation generated by the suspended end (2-2), drive the magnetic fluid (4) in the plurality of noise elimination regions to generate tangential oscillation, thereby attenuating acoustic energy of a sound entering the noise elimination chamber (6);

wherein an outer wall surface of the air compressor vent (1) corresponding to each of the plurality of noise elimination regions is provided with a magnetic device (8), and the magnetic device (8) is configured to, under a magnetic field generated by the magnetic device (8), limit a flow of the magnetic fluid (4); and wherein the magnetic device (8) is connected to a linear moving mechanism (9), and the linear moving mechanism (9) is configured to drive the magnetic device (8)

to move along an axial direction of an outlet of the air compressor, thereby changing a distance between the magnetic fluid (4) in the plurality of noise elimination regions and the suspended end (2-2) so as to change a frequency of the radial oscillation generated by the suspended end (2-2).

2. The noise elimination and vibration damping device for the air compressor as claimed in claim 1, wherein the magnetic device (8) is connected to a rotating mechanism (10), and the rotating mechanism (10) is configured to drive the magnetic device (8) to swing periodically around the outer wall surface of the air compressor vent (1); and the magnetic fluid (4) is configured to, under circumferential swinging of the magnetic fluid (4), alternately compress chambers on two sides of the magnetic fluid (4).

3. The noise elimination and vibration damping device for the air compressor as claimed in claim 1, wherein a second-stage noise elimination structure is disposed inside the noise elimination chamber (6), and the second-stage noise elimination structure is located in the noise elimination chamber (6) between the first-stage noise elimination structure (7) and the plurality of noise elimination regions.

4. The noise elimination and vibration damping device for the air compressor as claimed in claim 3, wherein the second-stage noise elimination structure is a perforated plate (3), an upper surface of the perforated plate (3) is connected to an inner wall surface of the noise elimination chamber (6), and a gap X is defined between a lower surface of the perforated plate (3) and an outer ring of the inner sleeve (2), and the gap X is larger than an amplitude of the inner sleeve (2) at an installation position of the perforated plate (3).

5. The noise elimination and vibration damping device for the air compressor as claimed in claim 1, wherein an installation groove (1-2) is defined on an inner wall surface of the air compressor vent (1) at a position of the suspended end (2-2); an elastic hollow tube (5) is disposed inside the installation groove (1-2), an outer wall surface of the elastic hollow tube (5) is in contact with the suspended end (2-2), and the elastic hollow tube (5) is defined with a through hole (5-1); and the suspended end (2-2) is configured to drive the elastic hollow tube (5) to oscillate together.

6. The noise elimination and vibration damping device for the air compressor as claimed in claim 5, an outer wall surface of the suspended end (2-2) is a conical surface (2-4), the elastic hollow tube (5) is configured to be tangent to the conical surface (2-4), and a center line (2-6) of the through hole (5-1) is parallel to the tangent line (2-5).

7. An air compressor, wherein at least one of an air inlet and an air outlet of the air compressor is provided with the noise elimination and vibration damping device as claimed in claim 1.

* * * * *